May 6, 1969  J. D. MAHONEY  3,442,411
RESEALABLE CONTAINER CLOSURE AND A PROCESS FOR ITS MANUFACTURE
Filed Dec. 28, 1964

INVENTOR.
JAMES D. MAHONEY
BY Clelle W. Zyschand
ATTORNEY.

United States Patent Office 3,442,411
Patented May 6, 1969

---

3,442,411
RESEALABLE CONTAINER CLOSURE AND A PROCESS FOR ITS MANUFACTURE
James D. Mahoney, McMurray, Pa., assignor to Mobay Chemical Company, Pittsburgh, Pa., a corporation of Delaware
Filed Dec. 28, 1964, Ser. No. 421,565
Int. Cl. B65d 53/00, 53/04, 53/06
U.S. Cl. 215—40     4 Claims

ABSTRACT OF THE DISCLOSURE

A process for preparing a container closure comprised of a substantially non-porous cap or substrate and a substantially rigid polyurethane foam inner liner adhered thereto, wherein the polyurethane foam is prepared from a polyaryl polyalkylene polyisocyanate, a blowing agent and an organic compound containing at least two active hydrogen-containing groups as determined by the Zerewitinoff method and having a high degree of dimensional stability as well as a density of about 1.5 lbs./ft.$^3$, and the unique container closure prepared therefrom.

---

Figure 1:
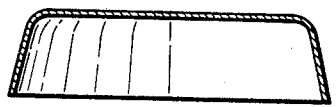

This invention relates to container closures and a process for making container closures from a cellular material.

Efficient sealing of bottles, jars and similar containers requires that an inert and chemically stable surface be tightly but resiliently held over the opening of the container being sealed. Many types of sealing members and sealing assemblies have been used for the purpose, but they have not been altogether satisfactory since they have been insufficiently resilient, or have flavored container contents adversely or have lacked inertness or been non-uniform and inconsistently available.

A common material used for container closures such as bottle caps has been cork. This material has not been completely satisfactory because of frequent interaction of the cork with the contents of the bottle. Often, especially after long storage times, it is found that cork liners become discolored, build up gummy deposits and stick to the bottle. These disadvantages have been overcome to some extent by the use of thin discs or spots made of aluminum or other metals, or plastic coated paper over that portion of the cork liner exposed to the contents of the container. The spot mentioned for curing the difficulties encountered in the use of cork, however, adds to the difficulties and expense of making the container closures.

Consequently, substitutes for cork have been sought, and among the numerous materials tried have been various modifications of corn stalks, peanut hulls, cellulosic materials and glue compositions. More recently vinyl resin plastics have been tried, but found to be wanting as efficient container closure materials since it is impossible to obtain as good sealing characteristics and pressure retention properties with these liners as is obtained with cork liners. These difficulties are due to the lack of compressibility which is required to obtain a good seal on closing the container.

Natural rubber and various synthetic compositions have been prepared in a cellular form in order to supply a resilient closure for container caps. These materials are almost totally useless, however, since they are affected by acids, alkalies and oils from food and other products, are not impervious to liquids and gases, especially over an extended period of time, do not retain their resilience, but tend to become rigid and unyielding in a very short time, are not temperature and moisture resistant, tend to leak, impart a flavor in many instances to stored foods, and are not generally obtainable in a consistently uniform composition. Further, where synthetic materials such as polyvinyl plastics are used in a cellular form to prepare a container closure, the plastic must first be prepared, plasticized into a plastisol composition, blown and fused. The foam thus formed in a myriad of steps is then deposited and must be subjected to a spinning process in order to disperse the deposited material into a relatively, although not a substantially uniform pad, as outlined in U.S. Patent 3,032,826. Such a process necessitates the employment of cumbersome and expensive equipment and the additional men to supervise the multitude of operations involved. Once completed, however, the liner is still deficient for a major number of applications because it is not capable of withstanding temperature variations such as are necessary in freezing or purification processes since it becomes brittle and breaks at low temperatures and becomes gummy and runny at higher temperatures.

It is therefore an object of this invention to provide a unique container closure which is devoid of the foregoing disadvantages and process for preparing same.

It is a further object of this invention to provide a unique container closure material which is substantially rigid, impervious to liquids and gases, unaffected by acids, alkalies and oils, resistant to the pressure of high sealing pressures, ideal for allowing a good seal initially and adapted to serve as a reusable sealing means, either alone or in conjunction with the substrate to which it is applied, has no tendency to curl, warp, or lose shape when alternately wetted and dried, is temperature and moisture resistant, leak resistant, does not flavor the contents, is inert and consistently obtainable in a uniform composition, is capable of being applied to a substrate without the need for an adhesive binding material, can be applied at a substantially uniform thickness without the need for additional steps or processes to make it uniform.

It is a still further object of this invention to provide a process for the preparation of a container closure which will allow all of the preceding objects to be accomplished in one step.

The foregoing objects and others which will become apparent from the following description are accomplished in accordance with the present invention, generally speaking, by providing in essentially one step, a unique container closure comprised of a substantially nonporous cap or substrate and a substantially rigid polyurethane foam innerliner adhered thereto. The polyurethane innerliner which is reusable and provides a good seal initially, as well as when it is reused, either alone or in conjunction with the substrate to which it is applied, has a high degree of dimensional stability and a density of about 1.5 lbs./ft.$^3$ and is prepared by the reaction between a polyaryl polyalkylene polyisocyanate, an organic compound or compounds containing at least two active hydrogen containing groups as determined by the Zerewitinoff method, and a blowing agent. Preferably, the polyaryl polyalkylene polyisocyanate is the phosgenation product of the compound obtained by the reaction of formaldehyde with aniline, and the active hydrogen containing compound is a polyether polyol having a molecular weight of about 400 and an hydroxyl number of about 750 and prepared by the condensation of propylene oxide with diethylene triamine and a polyether polyol having an hydroxyl number of about 223 and prepared by the condensation of 1,1,3-tri(hydroxyphenyl) propane in admixture with a propylene oxide adduct of glycerine having an hydroxyl number of about 652. The polyurethane formulation thus prepared is deposited on the substrate or container cap and allowed to foam to a thickness of at least about two or three times that of a conventional interliner. The cap is then applied to the container with the polyurethane foam disposed therebetween to effect a temperature and moisture-resistant seal and at the same time force the polyurethane foam to assume a cross-sectional shape substantially in the form of a T. Once removed, the T-shaped foam member assumes proportions only slightly larger than those of the opening about which it was disposed so that it is capable of effecting a reseal of the container.

Figure 2:
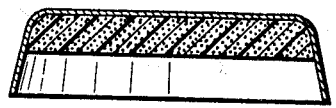
Figure 3:
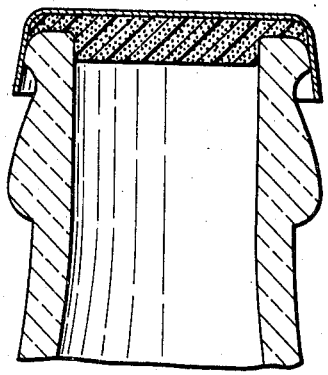
Figure 4:
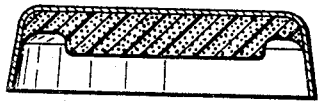
Figure 5:

The invention is particularly illustrated with reference to the accompanying drawings in which FIGURE 1 is a substantially nonporous container cap or substrate with no innerliner; FIGURE 2 is the same substrate with a foamed liner disposed therein; FIGURE 3 is the substrate and liner disposed upon and sealing a container; FIGURE 4 is the substrate and liner after removal from the container wherein the polyurethane innerliner assumes a cross-sectional shape substantially in the form of a T; FIGURE 5 is the polyurethane innerliner alone which has assumed dimensions only slightly larger than those it assumed while engaged between the substrate and the container, and which may be used to effect a reseal of the container either alone or in conjunction with the substrate.

In order to prepare the innerliner, the cellular material prepared from the components enumerated herein may be foamed into a block or any other convenient configuration, sliced, and cut to the required size and shape for preparing the closure, in which case, the requirement for impermeability of fluids would not be a significant factor, and the cellular material would be fluid pervious. Should a fluid impervious closure be thereafter desired, it would be an easy matter to cover the closure with a fluid-impervious sheet of any suitable material such as metal foil or a plastic material such as a polyolefin or a polyurethane sheet or any other suitable material. The formulation can also be foamed into a sheet of the proper thickness for the closure contemplated and cut into the desired configuration. In this instance, there is no need for a fluid impervious protecting sheet since the skin which forms on the surface of the material during the foaming operation is substantially impervious to fluids. A third, and the most preferred method for employing the formulation, is a foam-in-place operation wherein the components of the formulation can be added to one another, mixed, placed on the substrate, adhered and foamed in one simple operation to yield the ideal closure for any container.

In this third method, the components can be metered into a mixing apparatus as three components: (1) the resin, silicone stabilizer and the blowing agent, (2) the polyisocyanate, and (3) the catalyst. For the foaming-in-place operation, however, it is generally more expedient to meter the components into a mixer as two components, including the catalyst in the resin mixture. The advantage of the first method is that the amount of the catalyst may be more easily modified thus permitting rapid changes in the foaming characteristics of the formulation when and if desired. The second or two-component system is also efficient and has the advantage of storability over extended periods. The components are mixed, then, to yield a uniform composition which is capable of being prepared again and again with no difficulty in obtaining a reproducible uniformity. The mixed components can then be applied by using a machine such as is described in U.S. Reissue Patent 24,514 which is easily adapted for spraying thin panels of foam material, and which is also readily adapted to the spot spraying of relatively small areas as well. With this mechanism, a uniform pad of the foam formulation can be spot sprayed onto any size or shape of substrate without the need for adhesives or binders to affix it thereto. One of the particular advantages of a foam prepared from the formulation herein defined is that the foam adheres to a substrate when foamed in place with the same degree of tenacity as is obtained when conventional materials used as adherents for cork and the like materials used heretofore are employed. Should a greater degree of adherence be desired, it is a relatively simple matter to use a priming agent such as an epoxy resin or an amine silane compound to insure the utmost adhesion possible. The ability to spot spray a uniform pad of foam onto a substrate is also significant from the point of view of permeability. In such an operation, a skin which is impermeable to liquids and gases forms on the surface of the polyurethane mass foamed on the substrate. This formulation may also be deposited on a substrate by any other suitable means such as are well known in the art, although the preferred method of applying the formulation is the spot-spraying method defined above.

The foam formulation should be deposited on the substrate so that when completely foamed and expanded, the pad is of a thickness two or three times greater than that ordinarily used in the preparation of container closures. The substrate may then be sealed onto the container with the pad disposed therebetween and the container is sealed, thus forcing the pad to assume a cross-section substantially in the shape of a T. In this manner, a fluid impervious seal is provided with a substantially rigid cellular material which retains its shape after being sealed into the container and removed therefrom. One of the advantages to be derived from the formulation thus employed is the constant sealing property of the polyurethane material and the dimensional stability of the foamed material. As a consequence, when the substrate is removed and is incapable of reuse as is often the case since the advent of the self-opening bottle and can, the polyurethane sealing material formulated in accordance with this invention may be used alone to reseal the container should the whole contents thereof not be consumed or used up at one time. The polyurethane once removed, gives slightly so that it can be used to effect a rather effective seal of the container when forced back into the opening of the container. It is apparent, then, that this is an expedient which is particularly important when the removal of a self-opening bottle cap completely destroys the possibility of employing the cap for effective reuse. Where a self-opening cap is not the substrate, but where in the process of opening the container, as is often the case, the cap itself is ruined and rendered incapable of effective reuse, the saving grace of the polyurethane cap liner defined herein is afforded the consumer. It is also significant that due to the particular properties of the foam formulation proposed, a rigid cellular material is provided which allows for good and efficient sealing of the container in addition to allowing for subsequent efficiency in resealing because of the degree of give of the material when removed from the container which causes it to assume dimensions slightly larger than the dimensions of the opening in which it had been disposed. As a consequence, because of this particular formulation it is possible to make a polyurethane foam which is resilient enough to insure a good seal even at high pressures, and which is stable enough and inert enough so that the closure material may be used again and again or subjected to repeated opening and closing operations with no detriment to the sealing qualities of the closure or the rigidity of the material. Where a conventional container cover is the substrate, the pad may be used to effect a reseal of the container comparable to that initially obtained when the container was first sealed.

Those other qualities which are so important in the ideal sealing material for containers are inherent in the material prepared from the formulation defined herein and the advantages to be derived from the use of this foam for container closures is overwhelming. For example, it is amazing that the material may be foamed in place on the substrate in one simple operation to obtain a uniform and consistent material requiring no further processing or treatment. This factor alone is an innovation heretofore not obtainable or contemplated by the art. Further, since the foam can be readily formed in place there is an important economic factor represented in the savings derived due to the absence of scrap loss which is a necessary incident of the operation in which the material is first formed then sliced and then cut. The necessity of employing several or many steps which is apparent from a reading of the prior art, is completely obviated in a neat one-step method for preparing the formulation and depositing it on the substrate where it foams up to a uniform thickness encased in an impervious skin. Not only is there a saving because scrap loss is done away with, but the additional steps, the machinery required therefor and the men necessary for the supervision of these operations are no longer required.

Moreover, because of the physical and mechanical properties of the particular formulation employed, it is peculiarly adapted to use as a container closure material. As has already been mentioned, the material is impervious to liquids and gases, it remains unaffected by acids, alkalies and oils and is thus substantially inert to materials enclosed in the container. This is a particularly important and significant aspect of the formulation employed in the present process, and it is further significant that there is no peculiar flavor imparted to the contents as is the case with many other materials and formulations used heretofore; as a matter of fact, the polyurethane seals in the flavor of the contents and preserves the pressure where the contents must be sealed under pressure, in addition to allowing the container closure to be used with virtually any type of filling machinery.

The polyurethane material outlined herein has a substantially rigid nature with just the right degree of resiliency required for a container closure material which is initially efficient and which remains efficient on repeated opening and closing of the container. The polyurethane foam, therefore, allows an excellent seal to be executed, even when the container must undergo high pressure sealing initially.

The polyurethane foam defined has no tendency to curl, warp or lose its shape when alternately wetted and dried as has been the tendency of materials used for this purpose heretofore.

The polyurethane closure is capable of withstanding the temperature and moisture conditions generally incident to the storage of containers such as, for example, when the materials have to be kept frozen or deeply chilled. Further, where purification procedures are required, another one of the advantages of the present formulation becomes significant in that the foam defined herein is also capable of withstanding elevated temperatures, even those above 100° C., without suffering any detriment to properties or efficiency. This is an especially significant factor when other plastic formulations which may be proposed are considered. Polyvinyl and polystyrene formulations, for example, are completely incapable of withstanding temperature extremes without a complete collapse of properties. At high temperatures they melt or become gummy; at low temperatures they become brittle and shred. Therefore, the peculiar nature of the foam as defined herein is particularly impressive since it suffers from none of these difficulties.

Because of the peculiar nature of the polyisocyanate employed herein, the foam formulated in accordance with this invention has a dimensional stability not capable of being obtained with any other type of isocyanate. The isocyanate is a polyaryl polyalkylene polyisocyanate including crude 4,4'-diphenylmethane diisocyanate and the like. The preferred polyaryl polyalkylene polyisocyanates for use in the invention have the formula:

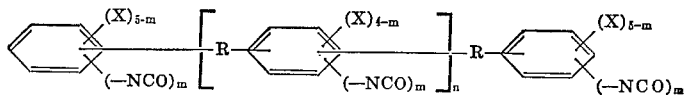

in which R is an organic radical and preferably an aliphatic radical obtained by removing the carbonyl oxygen from an aldehyde or ketone and is preferably , $m$ is 1 or 2, X is halogen, lower alkyl or hydrogen and $n$ is 0, 1, 2, or 3. The aliphatic radical, R, in the foregoing formula may be obtained by removing the carbonyl oxygen from any suitable aldehyde or ketone such as formaldehyde, acetaldehyde, propionaldehyde, butyraldehyde, N-heptaldehyde, benzaldehyde, cyclohexane aldehyde, acetone, methyl ethyl ketone, methyl-n-propyl ketone, diethyl ketone, hexanone-2, hexanone-3, di-n-propyl ketone, di-n-heptyl ketone, benzophenone, dibenzyl ketone, cyclohexanone and the like. To illustrate, if one removes the carbonyl oxygen from formaldehyde, $H_2C=O$, the radical remaining is a methylene radical or from acetone, $$CH_3—CO—CH_3$$

the radical remaining is

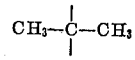

When X is halogen, it may be any suitable halogen but is preferably chlorine or bromine and further, it is preferred that the amount of chlorine or bromine fall between about one percent and fifteen percent by weight of the compound. When X is lower alkyl, it is most preferably methyl or ethyl but other lower alkyl radicals such as propyl, butyl and the like may be the radical, X. The polyaryl polyalkylene polyisocyanates of the invention are preferably mixtures of di- and higher polyisocyanates. Thus, $n$ in the formula preferably has a value of from about 0.1 to about 1.5. To illustrate, in a mixture of isocyanates of the above formula containing 90 percent diisocyanate and 10 percent triisocyanate, $n$ would have a value of 0.1. For a mixture containing 20 percent di-, 30 percent tri-, 30 percent tetra- and 20 percent penta-isocyanate, the average value of $n$ would be 1.5. A most preferred value for $n$ is between about 0.85 and about 1.1 with about 40 percent to about 60 percent of the mixture of polyisocyanates being a diisocyanate.

Isocyanates of the above formula are well-known and available commercially, and may be prepared as disclosed in U.S. Patent 2,683,730. A specific isocyanate suitable for use in accordance with the present invention may be obtained by reacting about 60 parts of aniline with about 25 parts of formaldehyde (aqueous, 37 percent $CH_2O$) and about 74 parts of HCl (aqueous, 30 percent HCl) at a temperature of about 90° C. to about 100° C. for about 1.5 to about 2 hours and then reacting this product with NaOH and departing out the crude amine. About 100 parts of phosgene are then reacted with the resulting amine until a product having an amine equivalent of about 135 and containing about 31 percent free —NCO is obtained. The free excess phosgene and substantially all of the solvents used, if any, are then removed.

The commercially available polyphenyl methane polyisocyanates are particularly adapted for use in the present invention. The best products have 40 percent to 60 percent 4,4'-diphenylmethane diisocyanate, an amine equivalent of about 125 to about 140, about 0.04 to about 0.3 percent by weight of hydrolyzable chloride, about 0.1 to about 0.5 percent by weight of total chloride and having a flash point of above 400° C. That these polyisocyanates and no other can be used to yield a foam having the properties demanded by an application of the kind to which this invention is directed is illustrated in the table below in which the critical factor of dimensional stability for an example is compared for foams employing the polyisocyanate defined above and other polyisocyanates readily available, with the same resin systems:

DIMENSIONAL STABILITY COMPARISON

| Isocyanate | Crude polyaryl polyalkylene polyisocyanate | Toluylene diisocyanate | Crude toluylene diisocyanate |
|---|---|---|---|
| Density, lbs./cu. ft. | 1.5 | 1.9 | 1.9 |
| Dimensional stability in percent volume change at— | | | |
| 4 weeks, 70° C., 100% R.H. | <10 | 25-50+ | 25-50 |
| 4 weeks, 100° C., ambient R.H. | No change | 25-50+ | 25-50 |

As this data shows, the best dimensional stability was obtained with the polyphenyl polymethylene polyisocyanate crude (used in the above table) despite the fact that the comparison was made with a significantly lower density foam than that used for the toluylene diisocyanate and crude toluylene diisocyanate foam product. It is therefore possible to prepare a medium-low density polyurethane which is foamed in place and adhered to the substrate with the strength characteristics and dimensional stability demanded for a suitable container closure which is capable of being produced in production methods with good reproducibility and has a lack of sensitivy to in-plant foaming conditions not exhibited by any other material proposed heretofore in the production of foams and foamed container closures.

The active hydrogen containing compounds outlined herein are the perfect complement for the polyisocyanate defined above in order to prepare a foam formulation having the necessary properties, and should be used in a ratio of about 17 parts by weight of the 1,1,3-hydroxyphenyl propane condensate of propylene oxide in admixture with the propylene oxide adduct of glycerine to about 3 parts by weight of the propylene oxide adduct of diethylene triamine. Other active hydrogen containing compounds may also be used in the preparation of a rigid polyurethane foam from the isocyanates defined herein. Some such suitable compounds are, for example, any suitable organic compound containing at least two active hydrogen containing groups as determined by the Zerewitinoff method. Generally speaking, any compound having an active hydrogen atom which will react with an —NCO group may be used. The alcoholic group is strongly preferred because it is readily available and yields a stronger urethane linkage than a phenolic type hydroxyl group. Moreover, to prepare polyurethane plastics, it is preferred to have an organic compound of the type specified above which contains a plurality of active hydrogen containing groups and preferably at least some alcoholic hydroxyl groups. It is to be understood that when the above terminology is used, active hydrogen containing compounds are contemplated which may contain any of the following types of active hydrogen containing groups, among others, —OH, —NH$_2$, —NH, —COOH, —SH and the like. Examples of suitable types of organic compounds containing at least two active hydrogen containing groups which are reactive with an isocyanate group are hydroxyl polyesters, polyhydric polyalkylene ethers, polyhydric polythioethers, polyacetals, aliphatic polyols, including alkane, alkene and alkyne diols, triols, tetrols and the like, aliphatic thiols including alkane, alkene and alkyne thiols having two or more —SH groups; polyamines including both aromatic, aliphatic and heterocyclic diamines, triamines, tetramines and the like; as well as mixtures thereof. Of course compounds which contain two or more different groups within the above-defined classes may also be used in accordance with the process of the present invention such as, for example, amino alcohols which contain an amino group and an hydroxyl group, amino alcohols which contain two amino groups and one hydroxyl group and the like. Also, compounds may be used which contain one —SH group and one —OH group or two —OH groups and one —SH group as well as those which contain an amino group and an —SH group and the like.

The molecular weight of the organic compound containing at least two active hydrogen containing groups may vary over a wide range. Preferably, however, the organic compounds containing at least two active hydrogen containing groups used in the production of the polyurethane plastic has a molecular weight of at least about 200 and to about 750 with an hydroxyl number within the range of from about 25 to about 800 and acid numbers, where applicable below about 5.

Any suitable hydroxyl polyester may be used such as are obtained, for example, from polycarboxylic acids and polyhydric alcohols. Any suitable polycarboxylic acid may be used such as, for example, oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, alpha-hydromuconic acid, beta-hydromuconic acid, alpha-butyl -alpha-ethyl-glutaric acid, alpha, beta-diethylsuccinic acid, isophthalic acid, terephthalic acid, hemimellitic acid, trimellitic acid, trimesic acid, mellophanic acid, prehnitic acid, promellitic acid, benzenepentacarboxylic acid, 1,4-cyclohexanedicarboxylic acid, 3,4,9,10-perylene-tetracarboxylic acid and the like. Any suitable polyhydric alcohol may be used such as, for example, ethylene glycol, 1,3-propylene glycol, 1,2-butylene glycol, 1,2-propylene glycol, 1,4-butylene glycol, 1,3-butylene glycol, 1,5-pentane diol, 1,4-pentane diol, 1,3-pentane diol, 1,6-hexane diol, 1,7-heptane diol, glycerine, trimethylolpropane, 1,3,6-hexanetriol, triethanolamine, pentaerythritol, sorbitol and the like.

Any suitable polyhydric polyalkylene ether may be used such as, for example, the condensation product of an alkylene oxide beginning with any suitable initiator. The initiator may be a difunctional compound including water so that the resulting polyether is essentially a chain of repeating alkylene oxy groups as in polyethylene ether glycol, polypropylene polybutylene ether glycol and the like; or the initiator may be ony suitable active hydrogen containing compound which may be a monomer or even a compound having a relatively high molecular weight including other active hydrogen containing compounds as disclosed above. It is preferred that the initiator have from 2 to 8 active sites to which the alkylene oxides may add including for example, amines, alcohols and the like. Any suitable alkylene oxide may be used such as, for example, ethylene oxide, propylene oxide, butylene oxide, amylene oxide, tetrahydrofuran, epihalohydrins such as epichlorohydrin, styrene oxide and the like. Any suitable initiator may be used including, for example, water, polyhydric alcohols, preferably having 2 to 8 hydroxyl groups, amines, preferably having 2 to 8 replaceable hydrogen atoms bonded to nitrogen atoms. Phosphorous acids may also be used, but the phosphorous compounds are somewhat peculiar in that a different mode of preparation may be required, as more particularly set forth below. The resulting polyhydric polyalkylene ethers with the various bases of nitrogen, phosphorous and the like may have either primary or secondary hydroxyl groups or mixtures of primary and secondary hydroxyl groups. It is preferred to use alkylene oxides which contain from 2 to 5 carbon atoms and, generally speaking, it is advantageous to condense from about 5 to about 30 mols of alkylene oxide per functional group of the initiator. There are many desirable processes for the preparation of polyhydric polyalkylene ethers including U.S. Patents 1,922,459, 3,009,939 and 3,061,625 or by the process disclosed by Wurtz in 1859 and in Encyclopedia of Chemical Technology, volume 7, pages 257 to 262, published by Interscience Publishers, Inc. (1951).

Specific examples of initiators are water, ethylene glycol, propylene glycol, glycerine, trimethylol propane, pentaerythritol, arbitol, sorbitol, maltose, sucrose, ammonia, diethanolamine, triethanolamine, dipropanolamine, tripropanolamine, diethanolpropanolamine, tributanolamine, 2,4 - tolylene diamine, 4,4' - diphenylmethane diamine, p,p',p'' - triphenylmethane triamine, ethylene diamine, propylene diamine, propylene triamine, N,N,N',N'-tetrakis-(2-hydroxypropyl) ethylene diamine, diethylene triamine and the like. The phosphorous containing polyols are more fully described below.

Any suitable polyhydric polythioether may be used such as, for example, the condensation product of thiodiglycol or the reaction product of a polyhydric alcohol such as is disclosed above for the preparation of the hydroxyl polyesters with any other suitable thioetherglycol. Other suitable polyhydric polythioethers are disclosed in U.S. Patents 2,862,972 and 2,900,368.

The hydroxyl polyester may also be a polyester amide such as is obtained, for example, by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl polyester with only a portion of the components being a diamine such as ethylene diamine and the like.

Any suitable polyacetal may be used such as, for example, the reaction product of formaldehyde or other suitable aldehyde with a polyhydric alcohol such as those disclosed above for use in the preparation of the hydroxyl polyesters.

Any suitable aliphatic polyol may be used such as, for example, alkane diols such as, for example, ethylene glycol, 1,3-propylene glycol, 1,2-propylene glycol, 1,4-butylene glycol, 1,3-butylene glycol, 1,5-pentane diol, 1,4-butane diol, 1,3-pentane diol, 1,6-hexane diol, 1,7-heptane diol, 2,2-dimethyl-1,3-propane diol, 1,8-octane diol and the like; including 1,20-eicosane diol and the like; alkene diols such as, for example, 1-butene-1,4-diol, 1,3-butadiene-1,4-diol, 2-pentene-1,5-diol, 2-hexene-1,6-diol, 2-heptene-1,7-diol and the like; alkyne diols such as, for example 2-butyne-1,4-diol, 1,5-hexadiyne-1,6-diol and the like, alkane triols such as for example, 1,3,6-hexanetriol, 1,3,7-heptane triol, 1,4,8-octane triol, 1,6,12-dodecane triol and the like; alkene triols such as 1-hexene-1,3,6-triol and the like; alkyne triols such as 2-hexyne-1,3,6-triol and the like; alkane tetrols such as, for example, 1,2,5,6-hexane tetrol and the like; alkene tetrols such as, for example, 3-heptene-1,2,6,7-tetrol and the like; alkyne tetrols such as, for example, 4-octyne-1,2,7,8-tetrol and the like.

Any suitable aliphatic thiol including alkane thiols containing two or more —SH groups may be used such as, for example, 1,2-ethane dithiol, 1,2-propane dithiol, 1,3-propane dithiol, 1,6-hexane dithiol, 1,3,6-hexane trithiol and the like; alkene thiols such as, for example, 2-butene-1,4-dithiol and the like; alkyne thiols such as, for example, 3-hexyne-1,6-dithiol and the like.

Any suitable polyamine may be used including for example aromatic polyamines such as, for example, p-amino aniline, 1,5-diamino naphthalene, 2,4-diamino toluylene, 1,3,5-benzene triamine, 1,2,3-benzene triamine, 1,4,5,8-naphthalene tetramine and the like; aliphatic polyamines such as, for example, ethylene diamine, 1,3-propylene diamine, 1,4-butylene diamine, 1,3-butylene diamine, diethyl triamine, triethylene tetramine, 1,3,6-hexane triamine, 1,3,5,7-heptane tetramine and the like; heterocyclic polyamines such as, for example, 2,6-diamino pyridene, 2,4-diamino - 5 - aminomethyl pyrimidine, 2,5-diamino-1,3,4-thiadiazol and the like.

Phosphorous containing compounds are often advantageously used because of the flame retarding effect which they impart to the resulting plastics. These compounds often contain 1 or 2 phosphorous atoms as a nucleus and then have alkylene oxide side chains bonded to the phosphorous nucleus through either phosphate or phosphite type linkages. The phosphate compounds are advantageously prepared by condensing a mixture of phosphorous pentoxide and water with an alkylene oxide as more particularly set forth above. It is advantageous to use mixtures of phosphorous pentoxide and water which correspond to about 80 percent phosphorous pentoxide and about 20 percent water. But any amount within the range of about 65 percent to 90 percent phosphorous pentoxide and the balance water may be used and the whole range is contemplated. The phosphites are advantageously prepared in accordance with the method of U.S. Patent 3,009,929 where triphenyl phosphite, for example, is reacted with a polypropylene ether glycol to prepare a product having a molecular weight of about 500. Other processes are disclosed in the patent. It is also possible to use polyethers based on phosphorous which contain nitrogen atoms in addition to the phosphorous atoms. These compounds may be represented by the general formula

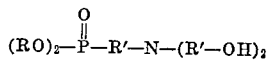

wherein R is lower alkyl or phenyl, for example, methyl, ethyl, propyl, butyl and the like and R' is alkylene, preferably having from 1 to 4 carbon atoms such as, methylene, ethylene, 1,2-propylene, 1,4-butylene and the like. A preferred compound is dioxyethylene-N,N-bis-(2-hydroxyethyl) aminomethyl phosphate.

Any of the compounds of any of the classes set forth above may be substituted with halogen such as, for example, chloro, bromo, iodo and the like; nitro, alkoxy, such as, for example, methoxy, ethoxy, propoxy, butoxy and the like; carboalkoxy such as, for example, carbomethoxy, carbethoxy and the like; dialkyl amino such as, for example, dimethyl amino, dipropyl amino, methyl ethyl amino and the like; mercapto, carbonyl, thiocarbonyl, phosphoryl, phosphato and the like.

Any suitable catalyst may be used in catalytic amounts in the practice of this invention; however, the actual catalyst used and particularly the amount of the catalyst used in the formulation are important factors governing the foaming rate and should be considered carefully when "tailoring" the formulation for different types of containers. Best results have been obtained with the use of 1-methyl-4-dimethyl aminoethyl piperazine, or a mixture of 1-methyl-4-dimethyl aminoethyl piperazine and stannous octoate. Any other suitable tertiary amine catalyst, either alone or in conjunction with organo-metallic compound, or any suitable organo-metallic compound alone may be used in the formulation outlined herein. Some such suitable catalysts include for example, dimethyl benzyl-amine, dimethyl stearyl amine, permethylated diethylene triamine, N-methyl-N'-dimethylaminoethyl piperazine, N,N'-endoethylene piperazine, N-alkyl morpholines; tertiary aminoethers such as, for example, 1-alkoxy-3-dialkylamino-propane, tertiary amines with ester groups, salts of tertiary amines, especially with organic acids such as, for example, oleic acid, benzoic acid, and the like, dibutyl tin dilaurate, dibutyl tin di-2-ethyl hexoate, dibutyl-tin-bis-(dimethylamino caproate), stannous octoate, stannous oleate, lead naphthenate, ferric acetylacetonate, mixtures thereof and any other catalyst which will promote the reaction between isocyanate groups and active hydrogen atoms as determined by the Zerewitinoff method as those disclosed in "Catalysts of the Isocyanate-Hydroxyl Reaction," J. W. Britain and P. G. Gemeinhardt, Journal of Applied Polymer Science, volume IV, issue No. 11, pages 207–211 (1960).

It is very desirable to have a foam stabilizer present in the course of the reaction and here one may use any suitable foam stabilizer including sulphonated castor oil and/or a foam stabilizer such as a silicone oil such as, for example, a polydimethyl siloxane or an alkyl silane polyoxyalkylene block copolymer. The latter type of silicone oil is disclosed in U.S. Patent 2,834,748. Where polyhydric polyalkylene ethers are included in the reaction mixture to prepare a cellular polyurethane plastic, it is preferred to employ a silicone oil of the above patent within the scope of the formula

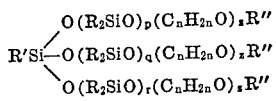

wherein R, R' nad R" are alkyl radicals having 1 to 4 carbon atoms; $p$, $q$ and $r$ each have a value of from 4 to 8 and $(C_nH_{2n}O)_z$ is a mixed polyoxyethylene oxypropylene group containing from 15 to 19 oxyethylene units and from 11 to 15 oxypropylene units with $z$ equal to from about 26 to about 34. Most preferred is a compound having the formula

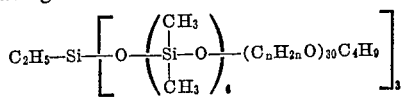

wherein $(C_nH_{2n}O)$ is a mixed polyoxyethylene and oxypropylene block copolymer containing about 17 oxyethylene units and about 13 oxypropylene units. Other suitable stabilizers are disclosed in Canadian Patents 668,537, 668,478 and 670,091. Other suitable compounds may therefore have the formula

where X is an integer and represents the number of trifunctional silicone atoms bonded to a single monovalent or polyvalent hydrocarbon radical, R'; R is a monovalent hydrocarbon group as defined above; $a$ is an integer having a value of at least 1 and represents the number of polyoxyalkylene chains in the block copolymer; $y$ is an integer having a value of at least 3 and denotes the number of difunctional siloxane units, $n$ is an integer from 2 to 4 denoting the number of carbon atoms in the oxyalkylene group; and $z$ is an integer having a value of at least 5 and denotes the length of the oxyalkylene chain. It will be understood further that such compositions of matter are mixtures of such block copolymers wherein $y$ and $z$ are of different values and that method of determining the chain length of the polysiloxane chains and the polyalkylene chains give values which represent average chain lengths. In the above formula, R represents monovalent hydrocarbon radicals, such as alkyl, aryl or aralkyl radicals, the polyoxyalkylene chain terminates with a hydrogen atom, R''' is an alkyl radical or a trihydrocarbonsilyl radical having the formula $R_3Si-$ where R is a monovalent hydrocarbon radical and terminates a siloxane chain, and R' represents a monovalent or polyvalent hydrocarbon radical, being monovalent when $x$ is 1, divalent when $x$ is 2, trivalent when $x$ is 3, tetravalent when $x$ is 4.

One type of block copolymer is represented when $x$ in the above formula is one, and in this instance a branched chain formula may be postulated as follows:

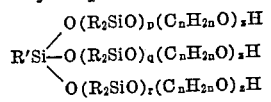

where $p+q+r$ has a minimul value of 3, the other subscripts being the same as in the immediately foregoing formula. In this instance, all three of the oxyalkylene chains are joined to the end of polysiloxane chains of the type $-(R_2SiO)-$. Specifically, one could use

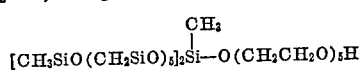

Any suitable blowing agent may be used in this formulation. The preferred blowing agent is trichlorofluoromethane, although any other suitable halogenated hydrocarbon may also be used such as dichlorodifluoroethane, dichlorodifluoromethane, trichlorofluoromethane, vinylidene chloride, methylene chloride, and the like. Furthermore, instead of water, low boiling hydrocarbons such as pentane, hexane, heptane, pentene, heptene and the like and azo compounds such as azohexahydrobenzodinitrile and the like.

In the preferred formulation to be used according to this invention, about 109 parts by weight (all parts hereinafter mentioned being by weight unless otherwise specified) of a polyisocyanate, prepared by the phosgenation of the compound obtained from the reaction of aniline with formaldehyde, about 85 parts of the condensation product of 1,1,3-tri(hydroxyphenyl) propane and propylene oxide having an hydroxyl number of about 223 in admixture with a propylene oxide adduct of glycerine having an hydroxyl number of 652, about 15 parts of the propylene oxide adduct of diethylene triamine having an hydroxyl number of about 750, about 40 parts of trichlorofluoromethane, about 1.1 parts of 1 methyl-4-dimethyl aminoethyl piperazine, and about 1.0 part of a foam stabilizer are mixed together to prepare the foam formulation which is then deposited onto the substrate and allowed to react and expand to a thickness about two or three times the conventional thickness for such pads. It is also an obviously expedient to use polyurethane foams to prepare container closures which are of a conventional thickness, if so desired, or thicknesses greater than two or three times the conventional thickness.

What is claimed is:

1. A removable sealing means for sealing the opening of a container comprised of a substantially non-porous substrate having affixed thereto an inert, substantially rigid cellular material having a substantially impervious cover, dimensional stability, and a density of about 1.5, said cellular material being affixed to said substrate and adapted to effect a temperature and moisture-resistant seal between the said container opening and the said substrate whereby the contents of the said container are substantially prevented from contacting the substrate and the outer walls of the said container, said cellular material being a polyurethane plastic prepared by the reaction between a polyaryl polyalkylene polyisocyanate, an organic compound containing at least two active hydrogen containing groups as determined by the Zerewitinoff method and a blowing agent.

2. A removable means for sealing the opening of a container which comprises a substantially non-porous substrate having affixed thereto an inert, substantially rigid cellular material having a substantially impervious cover, dimensional stability, and a density of about 1.5, said cellular material being affixed to said substrate and adapted to effect a temperature and moisture-resistant seal between the said container opening and the said substrate whereby the contents of the said container are substantially prevented from contacting the substrate and the outer walls of the said container, said cellular material being a polyurethane plastic prepared by the reaction between the phosgenation product of the compound obtained by the reaction of formaldehyde with aniline, a polyether polyol having a molecular weight of about 400 and prepared by the condensation of propylene oxide and diethylene triamine, a polyether polyol having an hydroxyl number of about 223 and prepared by the condensation of 1,1,3-tri(hydroxyphenyl) propane with propylene oxide in admixture with a propylene oxide adduct of glycerine having an hydroxyl number of about 652, and a blowing agent.

3. A process for the preparation of a container closure which comprises, preparing an inert substantially rigid polyurethane foam having a substantially impervious cover and adhered to a substantially non-porous substrate, said substrate being adapted to effect a removable seal in conjunction with said polyurethane foam for a container, said container having an opening for the introduction and delivery of the contents thereof and having inner walls and outer walls; wherein said polyurethane foam is prepared from a formulation obtained by reacting a polyaryl polyalkylene polyisocyanate, a blowing agent, an organic compound containing at least two reactive hydrogen atoms as determined by the Zerewitinoff method; depositing the said foam formulation on the said substrate; foaming the said polyurethane foam formulation while said foam formulation is deposited on said substrate to thus adhere the foamed polyurethane foam thereto, curing the foam, to a non-tacky state and thereafter applying the said substrate to the said container with the foamed polyurethane disposed therebetween to effect a temperature and moisture-resistant seal between the said container opening and the said substrate, whereby the contents of the container are substantially prevented from contacting the substrate and the outer walls of the said container, and the said foamed polyurethane is forced to assume a cross-sectional shape substantially in the form of a T, said substantially T-shaped polyurethane foam member being capable of effecting a reseal of the said container opening after removal of the said seal.

4. A process for the preparation of a container closure which comprises, preparing an inert substantially rigid polyurethane foam having a substantially impervious cover and adhered to a substantially non-porous substrate, said substrate being adapted to effect a removable seal in conjunction with said polyurethane foam for a container, said container having an opening for the introduction and delivery of the contents thereof and having inner walls and outer walls; wherein said polyurethane foam is prepared from a formulation obtained by reacting the phosgenation product of the compound obtained by the reaction between formaldehyde and aniline, a blowing agent, a polyether polyol having a molecular weight of about 400 and an hydroxyl number of about 750 and prepared by the condensation reaction of propylene oxide with diethylene triamine, and a polyether polyol having an hydroxyl number of about 223 and prepared by the condensation of 1,1,3-tri(hydroxyphenyl) propane with propylene oxide in admixture with a propylene oxide adduct of glycerine having an hydroxyl number of about 652; depositing the said foam formulation on the said substrate; foaming the said polyurethane foam formulation while said foam formulation is deposited on said substrate to thus adhere the foamed polyurethane foam thereto, curing the foam, to a non-tacky state and thereafter applying the said substrate to the said container with the foamed polyurethane disposed therebetween to effect a temperature and moisture-resistant seal between the said container opening and the said substrate, whereby the contents of the container are substantially prevented from contacting the substrate and the outer walls of the said container, and the said foamed polyurethane is forced to assume a cross-sectional shape substantially in the form of a T, said substantially T-shaped polyurethane foam member being capable of effecting a reseal of the said container opening after removal of the said seal.

References Cited

UNITED STATES PATENTS

| 2,465,662 | 3/1949 | Sanford | 215—43 |
| 3,169,656 | 2/1965 | Wieckmann | 215—40 |
| 3,193,127 | 7/1965 | Greenlie | 215—39 |
| 3,202,307 | 8/1965 | Rainer et al. | 264—45 |
| 3,270,904 | 9/1966 | Foster et al. | 215—42 |
| 2,683,730 | 7/1954 | Seeger et al. | |

OTHER REFERENCES

Carwin Co. Bulletin: "PAPI-Polymethylene polyphenylisocyanate," Data Sheet, North Haven, Conn., December 1961, pp. 1 and 2. Copy in 264–54.

PHILIP E. ANDERSON, *Primary Examiner.*

U.S. Cl. X.R.

161—160; 260—2.5; 264—45, 54, 268